United States Patent [19]

Matayoshi

[11] 4,237,998
[45] Dec. 9, 1980

[54] SOUND INSULATING ARRANGEMENT AROUND A VEHICLE GEAR SHIFT LEVER

[75] Inventor: Hiroshi Matayoshi, Tokyo, Japan

[73] Assignee: Nissen Motor Company, Limited, Kanagawa, Japan

[21] Appl. No.: 59,627

[22] Filed: Jul. 23, 1979

[30] Foreign Application Priority Data

Aug. 2, 1978 [JP] Japan .......................... 53/106448[U]

[51] Int. Cl.³ ............................................ G10K 11/00
[52] U.S. Cl. .................................... 181/175; 181/200; 180/89.14
[58] Field of Search ................ 181/175, 200, 204, 207; 180/89.14, 89.15

[56] References Cited

U.S. PATENT DOCUMENTS 3,926,068  12/1975  Jantzen et al. ..................... 180/89.14
3,990,535  11/1976  Bruce ................................. 181/207

FOREIGN PATENT DOCUMENTS 2062445  6/1972  Fed. Rep. of Germany ........ 180/89.14

Primary Examiner—George H. Miller, Jr.
Assistant Examiner—Benjamin R. Fuller
Attorney, Agent, or Firm—Lowe, King, Price & Becker

[57] ABSTRACT

A sound insulating arrangement for a vehicle including a gear shift lever extending upward into the passenger compartment of the vehicle through an aperture formed in the floor panel thereof is disclosed. The arrangement comprises a shift lever boot having a bottom opening larger than the aperture and a top opening in fitting engagement with the gear shift lever and secured to the floor panel so as to cover the aperture. The arrangement also comprises a sound insulating plate having a center hole for penetration of the gear shift lever and a number of slits radially extending from the center hole for freedom of movement of the gear shift lever. The shift lever boot is provided at least partially with a bellows portion in one fold of which the sound insulating plate is fitted.

4 Claims, 4 Drawing Figures

SOUND INSULATING ARRANGEMENT AROUND A VEHICLE GEAR SHIFT LEVER

BACKGROUND OF THE INVENTION

1. Field of the Invention

This invention relates to a sound insulating arrangement for a vehicle including a gear shift lever extending through an aperture formed in the floor panel of the vehicle for preventing direct travel of sounds created below the floor panel into the passenger compartment thereof through the aperture.

2. Description of the Prior Art

In vehicles such as motor vehicles, the gear shift lever has its lower end connected through a link mechanism to a speed change gear and extends upward into the passenger compartment through an aperture formed in the floor panel near the driver's seat. The aperture is relatively large for freedom of movement of the gear shift lever and thus sounds created below the floor panel due to engine vibrations and impacts exerting on the vehicle body will directly travel into the compartment through the aperture. Such sounds can be insulated to some extent, although to an insufficient extent, by a shift lever boot normally provided to cover the aperture for the purpose of good appearance and safety driving.

FIG. 1 is an exploded perspective view of a conventional structure which has been proposed in order to prevent direct travel of sounds into the compartment with greater efficiency. The structure comprises a sound insulating plate a interposed between the shift lever booth b and the floor panel c so as to close the aperture d without any restricted freedom of movement of the gear shift lever. However, such a conventional sound insulating arrangement requires separated drilling operations and mounting parts such as a bracket and lock screws, which results in poor manufacturing and assembly efficiency and high cost. That is, the sound insulating plate a should be formed at its corners or periphery with mounting holes e and secured to the floor panel c together with the shift lever boot b by means of through screws f.

SUMMARY OF THE INVENTION

It is therefore one object of the prsent invention to provide an improved sound insulating arrangement which will be free from the above-mentioned and other disadvantages of the prior art arrangement.

Another object of the present invention is to provide an improved sound insulating arrangement which will be easy to assemble and low in manufacturing cost.

Other objects and advantages of the present invention will become apparent to those skilled in the art from a consideration of the fllowing detailed description of one exemplary embodiment of the invention.

BRIEF DESCRIPTION OF THE DRAWINGS

The following description of the invention is had in conjunction with the accompanying drawings, in which like reference characters refer to the same or corresponding parts, and wherein.

DETAILED DESCRIPTION OF THE INVENTION

Figure 1:
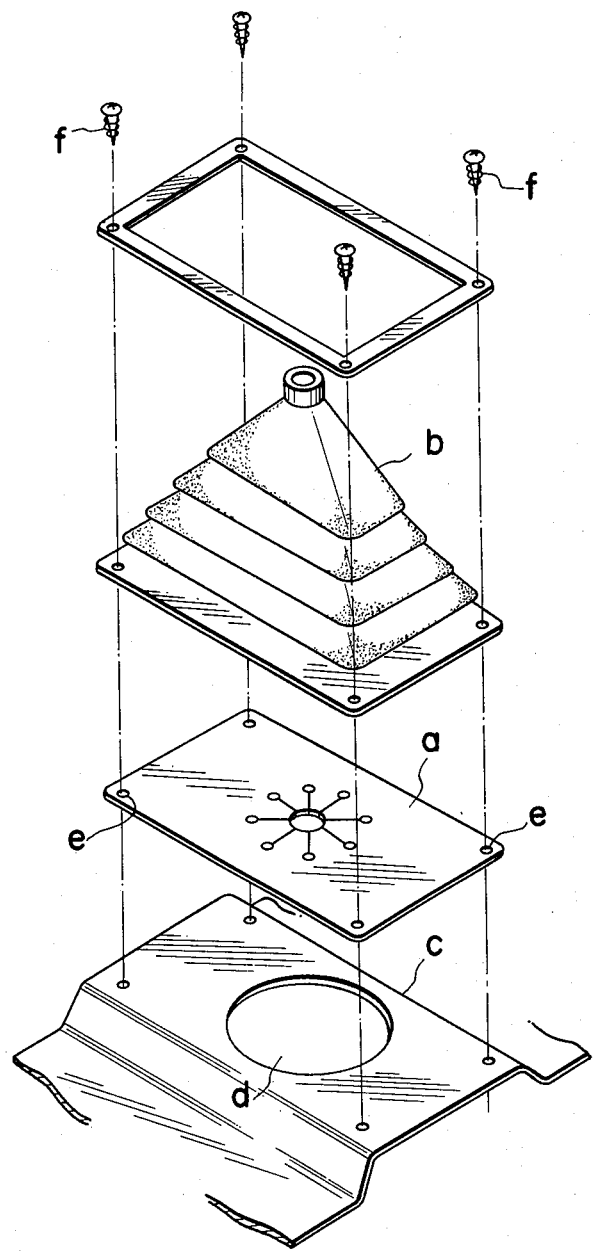
FIG. 1 is an exploded perspective view showing a conventional sound insulating arrangement.
Figure 2:
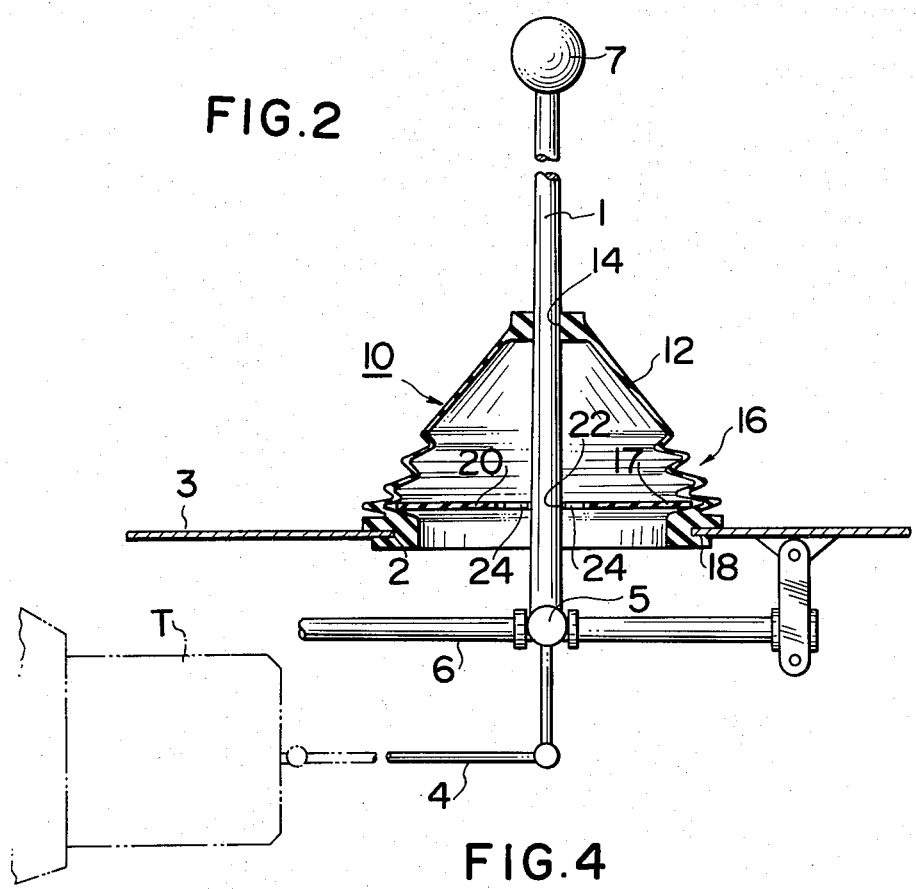
FIG. 2 is a sectional view showing one embodiment of a sound insulating arrangement of the present invention.
Figure 3:
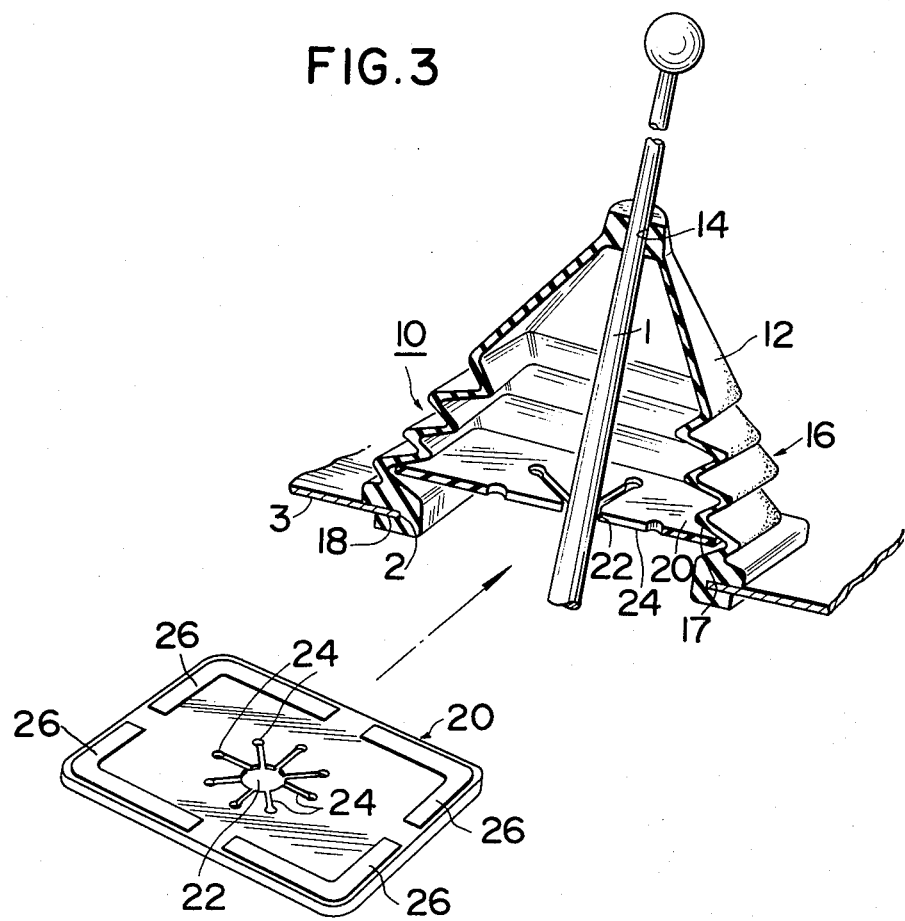
FIG. 3 is a perspective view in section showing the arrangement of FIG. 1.

Referring now to FIGS. 2 and 3 there is illustrated a sound insulating arrangement 10 embodying the present invention as applied to a vehicle including a gear shift lever 1 extending through an aperture 2 formed in the floor panel 3 of the vehicle into the compartment thereof. The gear shift lever 1 has its lower end connected to a control rod 4 through a ball joint 5 held by a support rod 6 for swinging movement about the ball joint 5. The control rod 4 is connected to a transmission T located below the floor panel 3. The gear shift lever 1 terminates at its upper end in an operation knob 7. The aperture 2 is generally of a rectangular shape and of a relatively large size for permitting swinging movement of the gear shift lever 1.

The sound insulating arrangement 10 comprises a shift lever boot 12 generally of a pyramid shape and formed of a resilient material such as soft resin or the like. The shift lever boot 12 has a bottom opening slightly larger in size than the aperture and a top opening 14 in fitting engagement with the gear shift lever 1. The shift lever boot 12 is provided at least partially with a bellows portion 16 and in its lower end portion with a groove 18 for engagement with the edge of the aperture 2 of the floor panel 3.

The sound insulating arrangement 10 also comprises a sound insulating plate 20 generally of a rectangular shape and formed of a flexible material such as rubber, vinyle chloride or the like. The sound insulating plate 20 has a center hole 22 for penetration of the gear shift lever 1 and a number of slits 24 radially extending from the center hole 22 for freedom of movement of the gear shift lever 1. The sound insulating plate 20 is provided at its corner portions with L-shaped reinforcing members 26 formed of a high rigid material such as metal, hard resin or the like for providing greater peripheral strength for the sound insulating plate 20. The sound insulating plate 20 is fitted in the lowermost fold 17 of the bellows portion 16 of the shift gear boot 12.

In setting the sound insulating arrangement 10 of the present invention around the gear shift lever 1, the gear shift lever 1 is passed through the aperture 2 of the floor panel 3 and the opeation knob 7 is removed from the gear shift lever 1. After fitting the sound insulating plate 20 in the lowermost fold 17 of the bellows portion 16 of the shift lever boot 12, the gear shift lever 1 is passed through the center hole 22 of the sound insulating plate 20 and then through the top opening 14 of the shift lever boot 12. Subsequently, the groove 18 of the shift lever boot 12 is fittingly engaged with the edge of the aperture 2 of the floor panel 3.

The freedom of movement of the gear shift lever 1 is assured by the radially extending slits 24 of the sound insulating plate 20 and the deformability of the sound insulating plate 20 itself. While, the sound insulating plate 20 is provided with higher peripheral strength by the reinforcing members 26 provided at the corner portions of the sound insulating plate 20 so that the sound insulating plate 20 can positively be held in engagement with the fold of the bellows portion 16 of the shift lever boot 12. A reinforcing member may be provided on the entire peripheral portion of the sound insulating plate 20 although this would restrict the freedom of movement of the gear shift lever 1 to some extent.

Figure 4:
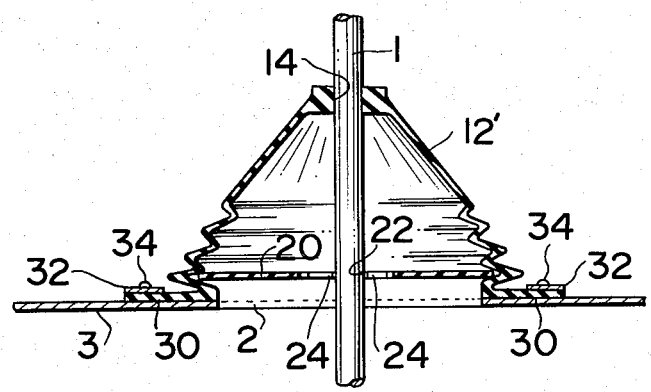
FIG. 4 is a sectional view showing an alternative embodiment of the present invention.

Referring to FIG. 4 there is illustrated an alternative embodiment of the present invention which is substantially similar in structure to the first described embodiment except that the shift lever boot 12' is not formed in its lower end portion with the groove 18 but with a flange 30 through which the shift lever boot 12' is secured to the floor panel by means of the bracket 32 and screws 34.

In accordance with the present invention, mounting of the sound insulating plate can be accomplished simply by fitting it in one fold of the bellows portion of the shift lever boot. This eliminates the need for the use of any bracket and screws and also achieves high mounting and assembly efficiency.

While this invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A sound insulating arrangement for a vehicle including a gear shift lever extending upward into the compartment of the vehicle through an aperture formed in the floor panel thereof, the arrangement comprising a shift lever boot 12 having a bottom opening slightly larger in size than the aperture 2 and a top opening in fitting engagement with the gear shift lever 1, the shift lever boot fixed to the floor panel 3 so as to cover the aperture, the shift lever boot provided at least partially with a bellows portion 16, a sound insulating plate 20 fitted in one fold 17 of the bellows portion of the shift lever boot, the sound insulating plate having a center hole 22 for penetration of the gear shift lever and a number of slits 24 radially extending from the center hole for freedom of movement of the gear shift lever, thereby preventing direct travel of sounds created below the floor panel into the compartment through the aperture.

2. A sound insulating arrangement as set forth in claim 1, wherein the shift lever boot 12 is formed in its lower end portion with a groove 18 for engagement with the edge of the aperture of the floor panel.

3. A sound insulating arrangement as set forth in claim 1, wherein the shift lever boot 12 is secured to the floor panel by means of screws.

4. A sound insulating arrangement as set forth in claim 1, wherein the sound insulating plate is provided at its each corner with a reinforcing member for providing greater peripheral strength for the sound insulating plate.

* * * * *